United States Patent [19]

Shimamoto

[11] Patent Number: 4,521,877
[45] Date of Patent: Jun. 4, 1985

[54] REPRODUCING STYLUS AND METHOD OF MAKING SAME

[75] Inventor: Hiroshi Shimamoto, Niiza, Japan

[73] Assignee: Namiki Precision Jewel Co., Ltd., Japan

[21] Appl. No.: 463,313

[22] Filed: Feb. 2, 1983

[30] Foreign Application Priority Data

| Feb. 2, 1982 [JP] | Japan | 57-015283 |
|---|---|---|
| Mar. 23, 1982 [JP] | Japan | 57-047539 |
| Apr. 21, 1982 [JP] | Japan | 57-056814[U] |

[51] Int. Cl.³ .......................... G11B 3/44; B24B 1/00
[52] U.S. Cl. ..................................... 369/173; 51/327; 51/281 R; 76/DIG. 12
[58] Field of Search ............................. 369/173, 170; 76/DIG. 12; 51/327, 326, 281 R

[56] References Cited

U.S. PATENT DOCUMENTS

| 1,914,658 | 10/1929 | Funk | 369/173 |
|---|---|---|---|
| 3,292,936 | 6/1964 | Grado | 369/173 |
| 3,534,968 | 10/1970 | Puleston | |
| 3,774,918 | 11/1973 | Shibata | 369/173 |
| 3,871,664 | 3/1975 | Hughes | 369/173 |
| 4,104,832 | 8/1978 | Keizer | 51/281 |
| 4,165,560 | 8/1979 | Matsumoto | 369/173 |
| 4,416,005 | 11/1983 | van den Hul | 369/173 |

FOREIGN PATENT DOCUMENTS

| 257087 | 5/1912 | Fed. Rep. of Germany | 369/173 |
|---|---|---|---|
| 138117 | 6/1934 | Fed. Rep. of Germany | 369/173 |
| 768414 | 2/1957 | France . | |
| 47-4410 | 12/1972 | Japan . | |
| 47-31402 | 12/1972 | Japan . | |
| 51-17885 | 12/1976 | Japan . | |
| 51-19965 | 12/1976 | Japan . | |
| 51-17883 | 12/1976 | Japan . | |
| 52-43564 | 12/1977 | Japan . | |
| 55-2643 | 12/1980 | Japan . | |

Primary Examiner—Steven L. Stephan
Attorney, Agent, or Firm—Gerald J. Ferguson, Jr.; Joseph J. Baker

[57] ABSTRACT

A reproducing stylus for a record having a sound groove, said stylus formed by removing front and back portions of its contact area with the sound groove to obtain an edge line portion having an orientation perpendicular to the direction of record travel and a width d where the effective radius of curvature of the stylus tip is approximately ½ d. The edge line portion is formed by reciprocally moving and grinding the tip on a grinding groove.

28 Claims, 29 Drawing Figures

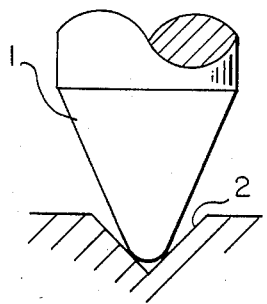
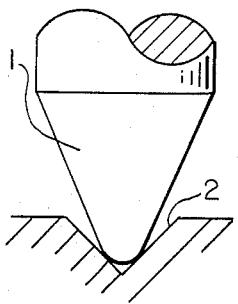
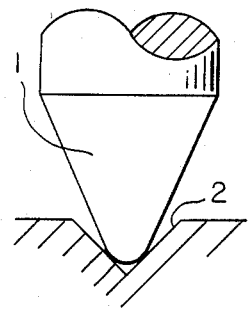
FIG. 1a (PRIOR ART)  FIG. 1b (PRIOR ART)  FIG. 1c (PRIOR ART)
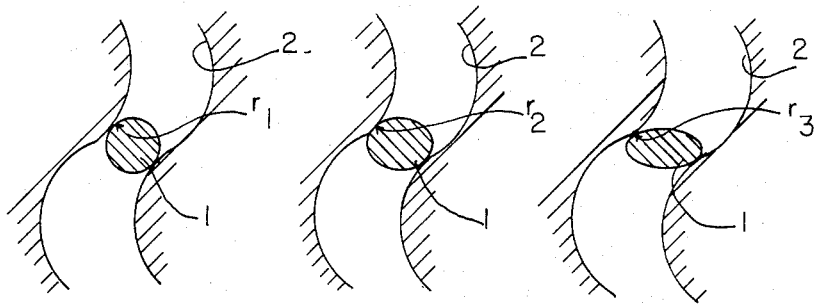
FIG. 1d (PRIOR ART)  FIG. 1e (PRIOR ART)  FIG. 1f (PRIOR ART)

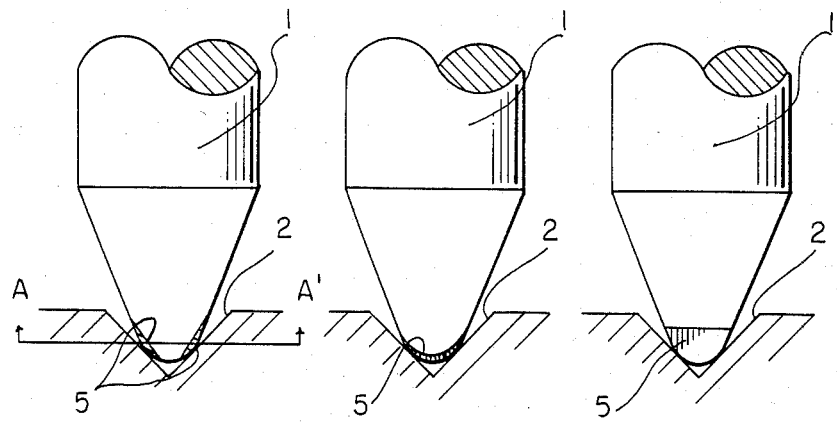
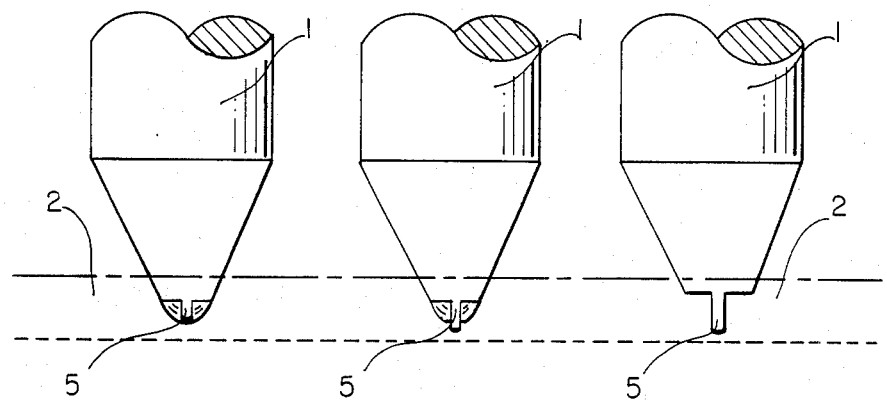
FIG. 3a  FIG. 3b  FIG. 3c
FIG. 3d  FIG. 3e  FIG. 3f

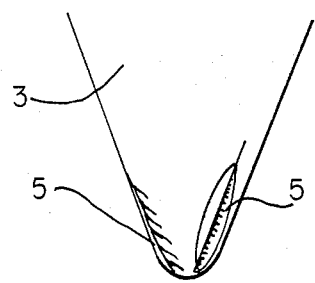 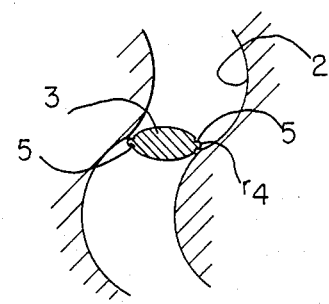
FIG. 4a   FIG. 4b
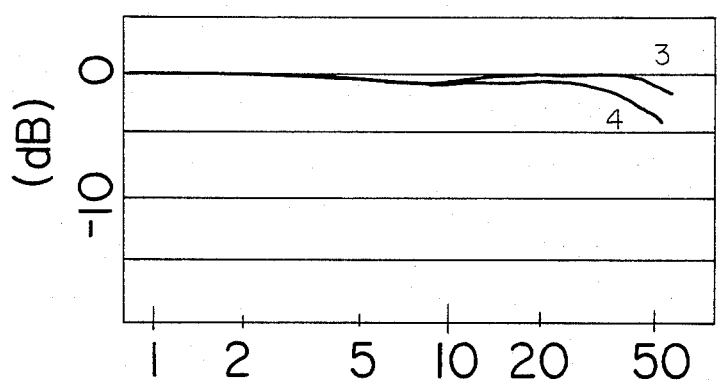
FIG. 5

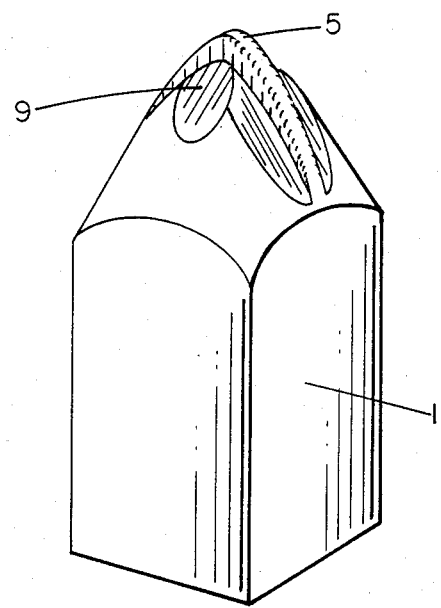
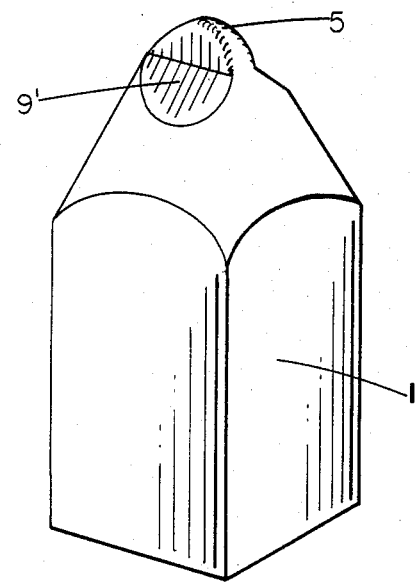
FIG. 9aFIG. 9b
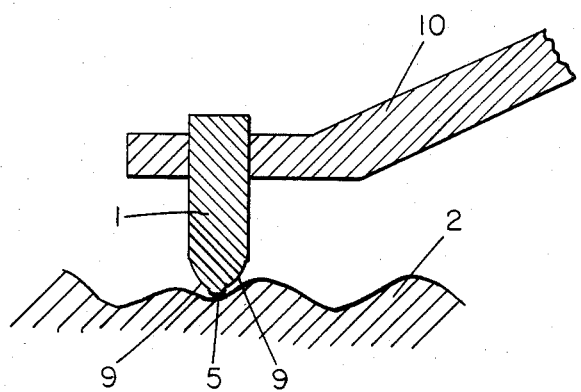
FIG. 10

REPRODUCING STYLUS AND METHOD OF MAKING SAME

BACKGROUND OF THE INVENTION

This invention relates to a reproducing stylus for a record and, in particular, to an improved shape thereof including a method for making the shape.

The shape of reproducing stylus tips for records developed from a round stylus to an elliptical stylus in order to reduce tracing distortion, which is required for stereophonic reproduction. Subsequently, a line contact stylus was developed in order to improve the high frequency responses required for 4-channel reproduction. FIG. 1 shows front views, a round stylus (a), an elliptical stylus (b), and a line contact stylus (c). Cross-sectional views of the contact areas of these respective styli with the record sound groove 2 are shown at (d), (e), and (f). The elliptical stylus (b) was formed in order to eliminate the pinch effect and tracing distortion occurring with round stylus (a) and to reduce the radius $r_1$ of the stylus tip curvature at the contact area with the phonograph record. The line contact stylus (c) was formed by further reducing the radius $r_2$ of the stylus tip curvature by special grinding to radius $r_3$ for line contact with the record sound groove 2, which expanded the reproduction frequency band as well as reduced friction of the reproducing stylus to a minimum. Various shapes and manufacturing methods have since been proposed. However, when the frequency responses of a pick-up cartridge attributable only to the radius of stylus tip curvature are considered, there are differences in the treble reproduction ability and responses between the outer circumference 3 and the inner circumference 4 of the phonograph record as seen in the case of a round stylus (a), an elliptical stylus (b), and a line contact stylus (c) shown in FIG. 2 respectively. This is directly related to the tracing distortion attributable to the radius of stylus tip curvature, and it has been considered very difficult to manufacture a stylus tip shape to obtain a radius of stylus tip curvature smaller than that of the currently available, most superior line contact stylus.

SUMMARY OF INVENTION

A primary object of this invention is to provide line contact styli of improved configuration where the treble reproduction responses are greatly improved. A further object is to provide an efficient method of manufacturing the improved styli.

Other objects and advantages of this invention will be apparent from a reading of the following specification and claims taken with the drawing.

BRIEF DESCRIPTION OF THE DRAWING

FIGS. 1(a), (b) and (c) show front views of conventional record reproducing styli while FIGS. 1(d), (e), and (f) are cross-sectional views of the contact area of the respective styli with a record sound groove.

FIGS. 3(a), (b) and (c) are front views and FIGS. 3(d), (e), and (f) are respective side views of various embodiments of the record reproducing styli of this invention.

FIG. 4(a) shows a diagonal view of the FIG. 3(a) embodiment and FIG. 4(b) is a cross-sectional view along the line A—A' of FIG. 3(a) of the contact area with the record sound groove.

FIG. 5 shows the frequency response curves of the record reproducing styli of this invention.

FIGS. 9(a) and (b) are diagonal, perspective views of further modifications of the record reproducing stylus of this invention.

FIG. 10 is a cross-sectional side view of the styli of FIG. 9 showing them in the reproduction mode.

DETAILED DESCRIPTION OF PREFERRED EMBODIMENTS OF THE INVENTION

Figure 2A:
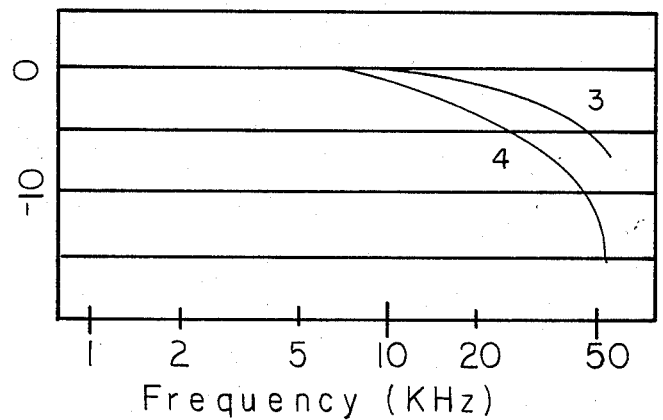
FIGS. 2(a), (b) and (c) show the frequency response curves for the conventional record reproducing styli of FIGS. 1(a), (b), and (c).
Figure 2B:
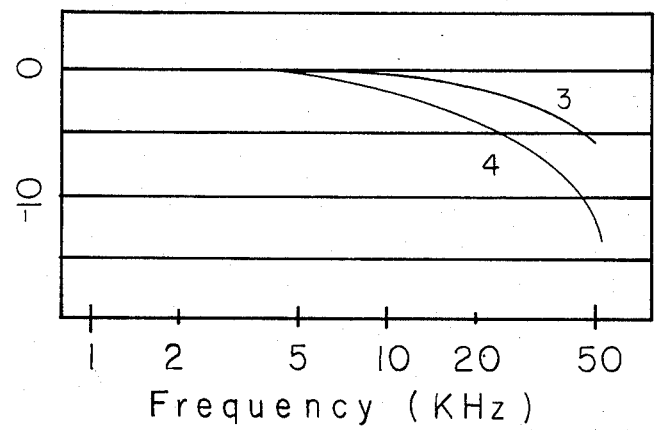
Figure 2C:
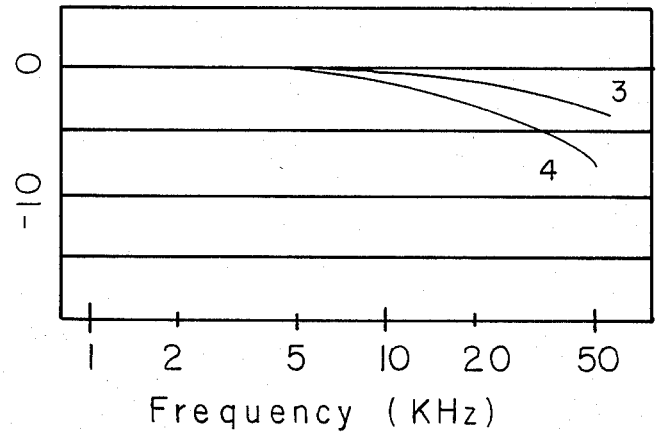

Reference should be made to the drawing where like reference numerals refer to like parts.

Referring to FIG. 3, a conical record reproducing stylus 1 made of diamond or sapphire is formed by removing the front and back of its contact areas with the sound groove of a record while retaining the edge line portions 5 in the perpendicular direction with respect to the direction of record travel. The reproducing stylus is set so as to contact the record sound groove on the edge line portions and the surfaces containing the edge line portions coincide with the radial direction of the phonograph record to perform record reproduction. FIGS. 3(a)–(c) show the front views and FIGS. 3(d)–(f) the side views of practical examples. FIGS. 3(a) and (d) is an example in which the edge line portions 5 of a T-shaped cross-section are formed only at the areas which contact the record sound groove 2; FIGS. 3(b) and (e) is an example in which the edge line portion with a T-shaped cross-section is continuously formed; while FIGS. 3(c) and (f) is an example in which the entire tip is formed to protrude in a planar form.

FIG. 4 shows a diagonal view (a) and a cross-sectional view (b) at A—A' of contact areas with the record sound groove 2 of FIG. 3(a). The effective radius of the stylus tip curvature $r_4$ is determined by the width of the T-shaped cross-section, that is, the width of the edge portion. As will be described in detail hereinafter, this edge portion can be formed by moving the conical tip of a record reproducing stylus material on a grinding groove. The width should be limited to 0.5–15 μm. The reason is that at a width of less than 0.5 μm, the strength of the edge line decreases, and exceeding a width of 15 μm results in the deterioration of high frequency responses.

In one working embodiment, the tip of an elliptical diamond stylus material was processed in the direction of its longer diameter on a grinding groove with a 5 μm width, and an edge line 3 μm wide and 5 μm high with a T-shaped cross-section was formed as shown in FIGS. 3(a) and (d). When this worked stylus was inserted into a pick-up cartridge, and the frequency responses of the phonograph record were measured, as shown in FIG. 5, virtually no difference in responses occurred between the outer circumference 3 and the inner circumference 4 of the phonograph record in the high frequency range, especially in the range up to 20 KHz, which is the upper limit of the audio band.

As described above, the record reproducing stylus in these embodiments of the invention is formed by removing the front and back of its contact points with the record sound groove while retaining the edge line portions in a direction perpendicular to the direction of record travel. It is the edge line portions which contact with the record sound groove. Thus, when the edge line width is made 6 μm, (corresponding to d in FIGS. 11-13) the effective radius of the stylus tip curvature is 3 μm (corresponding to R=d/2 in FIGS. 11-13) whereby the effective radius of the stylus tip curvature is greatly reduced. Consequently, it is effective in controlling the pinch effect and decreasing tracing distortion such that reproduction frequency responses are dramatically improved.

As a result, regarding the effect of the record reproducing stylus of this invention on sound quality, marked improvement in reproduced sound quality is demonstrated due to the fact that the stylus tip shape resembles that of a cutter stylus such that the reproduced sound resulting from the improved reproduction band and reduced reproduction distortion is very close to the original sound. Thus it is possible to obtain sound quality that is clear and with superior transient responses. Moreover, virtually no variation in sound quality was found between the outer circumference and the inner circumference of the phonograph record as in the conventional stylus design.

Figure 11:
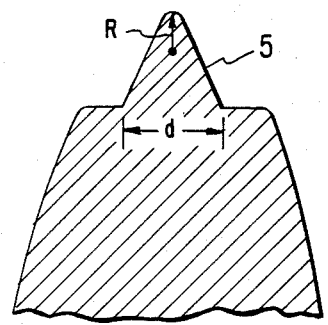
FIGS. 11, 12, and 13 are respective cross sectional views of V-shape, square U-shape, and U-shape edge portion in accordance with the invention.
Figure 12:
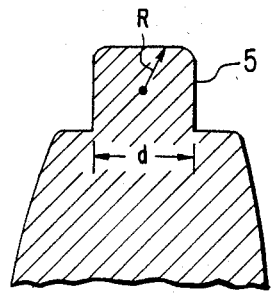
Figure 13:
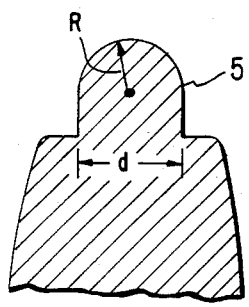

Referring to FIG. 6, different methods for making the styli of FIG. 3 are shown. In general, the tip of an approximately conical reproducing stylus material 1 made of diamond or sapphire is run on a grinding groove 6 or the grinding groove is moved with the reproducing stylus material fixed. In particular, the material tip and the grinding groove are moved reciprocally to grind and form an edge portion 5 with the ultra small width required to obtain the effective radius of curvature. The shape of the grinding groove cross-section may be a square U-shape, V-shape, or U-shape to form the cross-section of the reproducing stylus edge portion where cross sections for V-shape, square U-shape, and U-shape edge portions are illustrated in FIGS. 11-13, respectively.

Figure 6A:
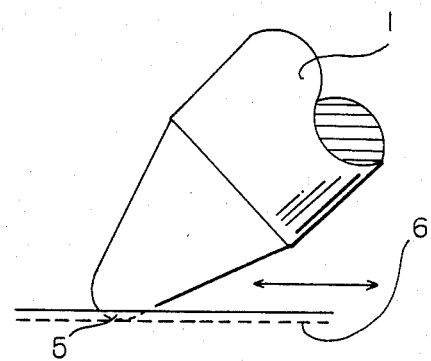
FIG. 6a–c shows three practical examples for the respective manufacturing of the record reproducing styli of FIG. 3.
Figure 6B:
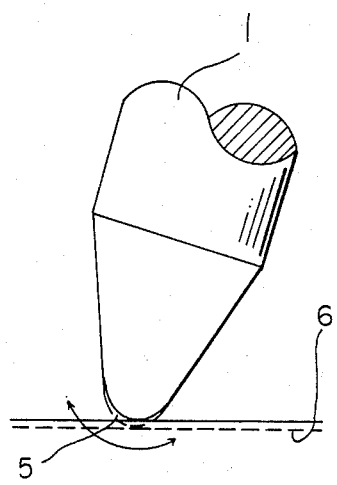
Figure 6C:
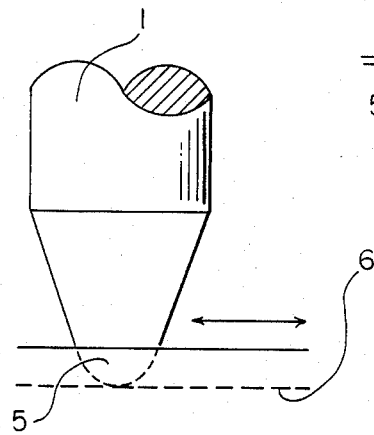

As one practical example, an edge portion can be formed partially within the record sound groove contact area as shown in FIG. 3(a) by tilting the reproducing stylus material at a certain angle and reciprocally moving and grinding the tip against the grinding groove as shown in FIG. 6(a). Also, as another example, the edge portion can be formed continuously as shown in FIG. 3(b) by continuously changing the inclination angle of the reproducing stylus material within the surface that contains its tip and by reciprocal movement and grinding the tip against the grinding groove as shown in FIG. 6(b). As still another example, a record reproducing stylus with a planar tip as shown in FIG. 3(c) can be manufactured by holding the reproducing stylus material with its axial line perpendicularly and by reciprocally moving and grinding the tip against the grinding groove as shown in FIG. 6(c). After forming the tip shape, the edge part is slightly rounded at corners to form a very small radius of the stylus tip curvature. The edge will come in contact with the record sound groove by joining at right angles a cantilever to the edge portion. As can be seen from the foregoing, the edge portion of the tip part is not formed by shaving. Rather, it is easily manufactured by reciprocal movement and grinding the reproducing stylus material tip part in an optional direction on a grinding groove having an ultra small width with embedded abrasive. Reproducing styli can be fabricated without irregularities in the edge width dimension in a shorter time than with conventional methods.

Figure 7:
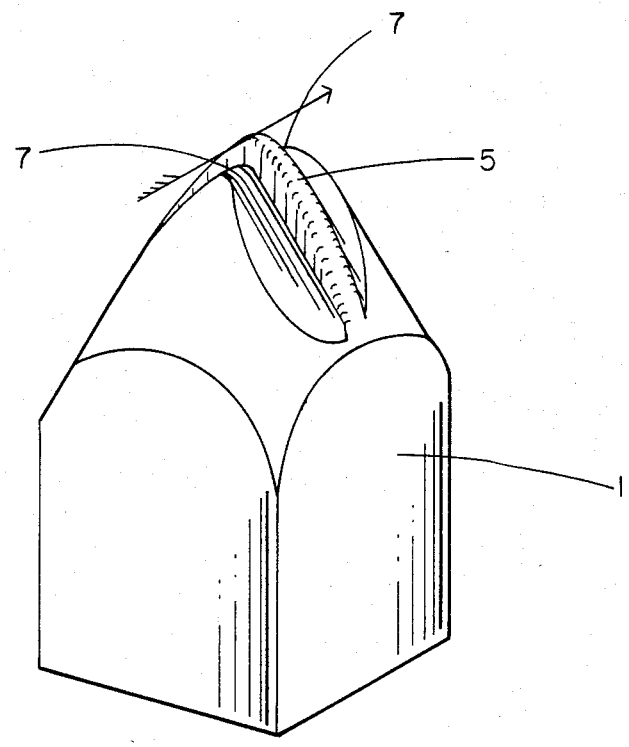
FIG. 7 is a diagonal, perspective view of the stylus of FIG. 3(b).
Figure 8:
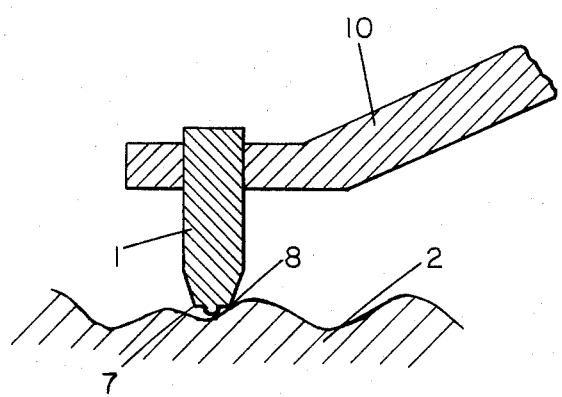
FIG. 8 is the cross-sectional side view of the FIG. 3(b) stylus showing it in the reproduction mode.

Reference should be made to FIGS. 7-10 for a discussion relating to a further modification of the invention where FIG. 7 is a perspective view and FIG. 8 is a cross-sectional view corresponding to FIG. 3(b).

With respect to FIG. 7, it is noted shoulders 7 remain after edge formation. These sometimes come in contact with slope 2 of the sound groove waveform against the travel direction of the record sound groove as shown in FIG. 8. In this case, the reproducing stylus develops a partial information reproduction loss with respect to the record sound groove. Such a phenomenon is especially marked where high frequency signals are recorded due to the short wave length of the waveform in those record sound grooves and it has been a cause of tracing distortion.

When the foregoing is a problem, it can be eliminated in accordance with the tip configurations of FIG. 9 where FIGS. 9(a) and (b) are perspective views which correspond to the styli of FIGS. 3(b) and (c) respectively.

Slope 9 and 9' are respectively formed at the adjoining front and back of the edge portion by removing the shoulders 7 such that the angle formed by the slopes and the axial center of the stylus is less than 45°. FIG. 10 is a cross-sectional side view showing the record reproduction state. The record reproducing stylus 1 supported by a cantilever 10 makes contact with the record sound groove 2 at its edge portion. Since a flank is formed by the slope 9 for the record sound groove wave surface, no contact is made anywhere other than at edge portion 5.

As explained above, unlike the conventional conical reproducing stylus, the tip shape of the record reproducing stylus of this invention does not form an apical angle of 55°-60°. Rather, by forming a flank for the edge portion to prevent contact with the record sound groove, tracing distortion in the high frequency region is eliminated in addition to gaining an expanded reproduction band by the edge portion having an ultra small effective radius of curvature. Furthermore, even when the reproducing stylus is worn, contact with the record sound groove other than at the edge can be prevented and it is effective in greatly improving the life of the reproducing stylus.

It is to be understood that the above detailed description of the various embodiments of the invention is provided by way of example only. Various details of design and construction may be modified without departing from the true spirit and scope of the invention as set forth in the appended claims.

What is claimed is:

1. A reproducing stylus for a record having a sound groove, said stylus formed by removing to a predetermined depth front and back portions of its contact area with the sound groove, said front and back portions being relative to the direction of stylus movement in the sound groove to obtain a groove contacting, ridge-like edge line portions having a lengthwise orientation perpendicular to the direction of record travel and a width d in said direction of record travel where the effective radius of curvature in said direction of record travel where the effective radius of curvature in said direction of record travel of the stylus tip is approximately ½ d.

2. A stylus as in claim 1 where two of said edge portions are formed within the contact areas with the sound groove of the record.

3. A stylus as in claim 1 where said edge portion is continuously formed.

4. A stylus as in claim 1 where the said front and back portions are removed from the tip of the stylus to form the edge portion.

5. A stylus as in claim 1 where d is 0.5–15 μm.

6. A stylus as in claim 1 where the said edge portion has corners, said corners being slightly rounded in the direction of record travel such that a very small radius of stylus curvature in the direction of record travel is formed at the tip.

7. A stylus as in claim 1 where said stylus has a longitudinally extending axial center and front and back sloping portions which extend adjacent the edge portion relative to said direction of stylus movement in the sound groove and where the angle formed between the front and back sloping portions and the axial center is less than 45°.

8. A method of manufacturing the stylus of claim 1 comprising the step of forming the edge portion by reciprocally moving and grinding the tip of the stylus material on a grinding groove having a predetermined width to obtain the effective radius of curvature.

9. A method of manufacturing the stylus of claim 2 comprising the step of forming the edge portion within the record sound groove contact area by first reciprocally moving and grinding the stylus material on a grinding groove by tilting it at a fixed angle and then by reciprocally moving and grinding it on the grinding groove in the same plane containing the axial line by tilting in the opposite direction at the same angle.

10. A method of manufacturing the stylus of claim 3 comprising the step of forming the edge portion by reciprocally moving and grinding the stylus material on a grinding groove by continuously changing the tilting angle at the surface containing the tip part.

11. A method of manufacturing the stylus of claim 4 comprising the step of forming the planar tip by reciprocally moving and grinding the stylus material on a grinding groove with with the longitudinal extending axial line of the stylus being maintained in a substantially orthogonal relationship with respect to the grinding groove.

12. A method of manufacturing as in claims 8, 9, 10, or 11 where the cross-sectional shape of the said grinding groove is either square U-shape, V-shape, or U-shape.

13. A reproducing stylus for a record having a sound groove, said stylus formed by removing to a predetermined depth front and back portions of its contact area with the sound groove, said front and back portions being relative to the direction of stylus movement in the sound groove to obtain a groove contacting, ridge-like edge portion of said predetermined depth having a lengthwise orientation perpendicular to the direction of record travel where the effective radius of curvature of the stylus at the edge portion in said direction of record travel is substantially reduced with respect to that at the contact area prior to the removal of the said front and back portions.

14. A stylus as in claim 13 where the cross-sectional shape of said edge portion in said direction of record travel in square U-shape, said edge portion having corners which are slightly rounded in the direction of record travel.

15. A stylus as in claim 14 where the width of said edge portion in said direction of record travel is d and the effective radius of curvature of the stylus tip in said direction of record travel is approximately ½ d.

16. A stylus as in claim 15 where d is 0.5–15 μm.

17. A stylus as in claim 13 where the cross-sectional shape of said edge portion in said direction of record travel is rounded U-shape.

18. A stylus as in claim 17 where the width of said edge portion in said direction of record travel is d and the effective radius of curvature of the stylus tip is approximately ½ d.

19. A stylus as in claim 18 where d is 0.5–15 μm.

20. A stylus as in claim 13 where the cross-sectional shape of said edge portion in said direction of record travel is V-shape and has an apex which is slightly rounded in the direction of record travel.

21. A stylus as in any one of claims 13–20 where two of said edge portions are formed within the contact areas with the sound groove of the record.

22. A stylus as in any one of claim 13–20 where said edge portion is continuously formed.

23. A stylus as in any one of claims 13–20 where the entire tip is cut off in planar form to form the edge portion.

24. A stylus as in any one of claims 13–20 where the angle formed by the front or back adjoining slope to the edge portion and the axial center is less than 45°.

25. A method of manufacturing the stylus of claim 13 comprising the step of forming the edge portion by reciprocally moving and grinding the tip of the stylus material on a grinding groove having a depth corresponding to said predetermined depth.

26. A method of manufacturing the stylus of claim 21 comprising the step of forming the edge portion within the record sound groove contact area by first reciprocally moving and grinding the stylus material on a grinding groove by tilting it at a fixed angle and then by reciprocally moving and grinding it on the grinding groove in the same plane containing the axial line by tilting in the opposite direction at the same angle.

27. A method of manufacturing the stylus of claim 22 comprising the step of forming the edge portion by reciprocally moving and grinding the stylus material on a grinding groove by continuously changing the tilting angle at the surface containing the tip part.

28. A method for manufacturing the stylus of claim 23 comprising the step of forming the planar tip by reciprocally moving and grinding the stylus material on a grinding groove with with the longitudinally extending axial line of the stylus being maintained in a substantially orthogonal relationship with respect to the grinding groove.

* * * * *